Patented Dec. 5, 1944

2,364,399

UNITED STATES PATENT OFFICE 2,364,399

PRODUCTION OF 2-MERCAPTO-THIAZOLINE

Ira Williams, Borger, Tex., Bernard M. Sturgis, Pitman, N. J., and John J. Verbanc, Wilmington, Del., assignors to E. I. du Pont de Nemours & Company, Wilmington, Del., a corporation of Delaware No Drawing. Application July 7, 1939, Serial No. 283,182

8 Claims. (Cl. 260—302)

This invention relates to improved methods for the preparation of 2-mercapto-thiazoline. 2-mercapto-thiazoline has the formula

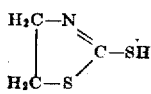

This compound is a very effective accelerator for the vulcanization of rubber. However, it has not been employed commercially for the reason that no economical method of making the compound in substantial yields has been known. It has been proposed to prepare this compound by refluxing an alkaline, alcoholic solution of 1 mole of ethanol amine with about 1 mole of carbon disulfide. Such method has not proved to be satis factory in practice due to the low yields, on the order of about 12 to 13% of theory. H. B. Stevenson in a copending application, Serial No. 283,179, filed July 7, 1939, has disclosed an improved method of making 2-mercapto-thiazoline wherein he employs at least 1.5 moles of carbon disulfide with each mole of ethanol amine, and obtains an improved yield up to about 40% of theory.

We have found a method of still further improving the yield of 2-mercapto-thiazoline. It is an object of the present invention to provide an improved method for the preparation of 2-mercapto-thiazoline. Another object is to provide a method for producing 2-mercapto-thiazoline in greatly improved yields over the processes of the prior art and over the process of Stevenson above referred to. A further object is to provide a more economical method of preparing 2-mercapto-thiazoline. Still further objects are to advance the art. Still other objects will appear hereinafter.

The above and other objects may be accomplished in accordance with our invention, which comprises reacting ethanol amine with carbon disulfide in a closed vessel under superatmospheric pressures and at temperatures in excess of 75° C. We have found that by employing such increased pressures and temperatures, we are enabled to greatly increase the yield of 2-mercaptothiazoline. In carrying out the reaction, we preferably employ more than 1 mole of carbon disulfide to each mole of ethanol amine. The best results are obtained with at least 2 molecular proportions of carbon disulfide to each mole of ethanol amine, and particularly with from about 2 to about 3 molecular proportions of carbon disulfide.

When it is attempted to carry out the reaction between ethanol amine and carbon disulfide under reflux, the temperatures will not exceed 75° C. By carrying out the reaction in a closed vessel, it is possible to heat the reacting mixture to temperatures in excess of 75° C. While it is possible to employ temperatures above 170° C., we have found that it is impractical to employ any temperatures above 170° C. Preferably we employ temperatures of from about 90° C. to about 130° C., as we obtain the best results thereby.

In carrying out the reaction in accordance with our process, we preferably employ the pressures produced by volatilization of the solvent, when employed, of the reacting ingredients and of the volatile reaction products. Higher pressures may be employed if desired and such higher pressures may be obtained by introducing into the reaction vessel an inert gas such as hydrogen sulfide, nitrogen and the like, under pressure. We have also found that the 2-mercapto-thiazoline is more stable toward decomposition when heated under such superatmospheric pressures.

We have found that the reaction can be carried out successfully either in the presence or in the absence of solvent and in the absence or in the presence of added basic material; in other words, basic material other than the ethanol amine. Any inert solvent may be used such as benzene, xylene, gasoline, carbon tetrachloride, alcohol, water, acetone, or mixtures of two or more thereof. Lower yields are generally obtained when a hydroxylated solvent, such as water or alcohol, is employed than when a nonhydroxylated solvent, such as benzene or cyclohexane, is employed. When a solvent is employed, we preferably employ the hydrocarbon solvent. However, we preferably carry out the reaction in the absence of solvent.

While the reaction can be carried out in the presence of added basic materials such as sodium hydroxide, potassium hydroxide, barium hydroxide, calcium hydroxide, zinc hydroxide and ammonia, better yields are obtained in the absence of materials more basic than the ethanol amine. The use of caustic is particularly objectionable in the presence of hydroxylated solvents, since it materially decreases the stability of the thiazoline. However, the best yields of the purest product are obtained in the absence of any added basic material; in other words in the absence of any basic material other than the ethanol amine.

The preferred method of our invention accordingly comprises heating 1 mole of ethanol amine with from about 2 to about 3 mols of carbon disulfide in a closed vessel at temperatures of about 90 to about 130° C. in the complete absence of solvent and alkali and at the superatmospheric pressures naturally obtained under such conditions. By this preferred method of our invention, yields of about 90% of substantially pure 2-mercapto-thiazoline are obtained. The product is composed of white or slightly gray crystals almost completely uncontaminated with by-products or tarry material. This product may be further purified, but even in its crude form, it is sufficiently pure for most purposes such as for accelerating the vulcanization of rubber. The weight of the crude product is usually 100% of theory and any loss in weight on purification is usually due to the solubility of the 2-mercapto-thiazoline in the water or other medium used for purification.

If desired, the 2-mercapto-thiazoline can most readily be purified by dissolving it in alkali and reprecipitating it with acid. However, it can also be purified by crystallization from various solvents such as water, alcohol or benzene, or by dissolving it in concentrated sulfuric acid and then diluting with water.

In order to illustrate our invention more clearly, the preferred modes of carrying the same into effect and the advantageous results to be obtained thereby, the following examples are given:

Example 1

31 grams of ethanol amine and 76 grams of carbon disulfide were heated in the absence of solvent in a pressure vessel for 6 hours at 100° C. The product was dissolved in alkali, reprecipitated by acid, filtered and dried. A yield of 95% of 2-mercapto-thiazoline, in the form of a fine white powder melting at 105°–106°, was obtained.

Example 2

244 grams of ethanol amine, 625 grams of carbon disulfide and 500 cc. of benzene were heated in a closed vessel for 6 hours at 100° C. The pressure increased to 400 pounds during the heating. The product was purified by crystallization from benzene. A yield of 90% of white crystals, melting at 104°–105° C., was obtained.

Example 3

31 grams of ethanol amine and 76 grams of carbon disulfide were heated in a closed vessel in 50 cc. of petroleum naphtha for 6 hours at 100° C. The mixture was cooled and the 2-mercapto-thiazoline recovered as a white solid by filtration. The yield was 82.5%.

Example 4

The process of Example 3 was repeated with cyclohexane as the solvent. A yield of 92.5% of white 2-mercapto-thiazoline was obtained.

Example 5

The process of Example 3, when repeated with toluene as the solvent, gave a yield of 87.5% of white 2-mercapto-thiazoline.

Example 6

1200 cc. ethanol amine and 3400 cc. of carbon disulfide were charged into an autoclave and heated at 110° C. for 6 hours. After the reaction was completed the autoclave was cooled and vented. The crystalline product was dissolved in sodium hydroxide, filtered, and then reprecipitated with sulfuric acid. The fine white product was filtered off and dried. The yield was 93% of 2-mercapto-thiazoline. It was analyzed, the following results being obtained:

|  | Found | Calculated |
| --- | --- | --- |
|  | Per cent | Per cent |
| Sulfur | 53.24 | 53.7 |
| Nitrogen | 11.73 | 11.78 |

Example 7

The process of Example 6 was repeated except that the heating was continued for 8 hours at 90° C. The yield of product was 91% of theory, after purification.

Example 8

30 cc. ethanol amine, 25 cc. of water and 70 cc. of carbon disulfide were heated in a pressure vessel for 6 hours at 100° C. The yield of 2-mercapto-thiazoline, after purification, was 75.6% of theory.

Example 9

The process of Example 8 was repeated using alcohol as the solvent, rather than water. The yield of purified product was 68%.

Example 10

A steel bomb was loaded with 30.5 grams of ethanol amine, 80 grams of carbon disulfide, and 5 grams of solid sodium hydroxide. The bomb was heated at 100° C. for a period of six hours. The bomb was cooled and opened and the contents dissolved in dilute sodium hydroxide solution. This solution was filtered and then the product was precipitated with hydrochloric acid. A 62.2% yield of 2-mercapto-thiazoline was obtained, melting at 103–105° C.

Example 11

Into a pressure vessel were loaded 1 gram mole of ethanol amine, 2.1 gram moles of carbon disulfide, 2 gram moles of sodium hydroxide, and 10 gram moles of water. The reactants were heated for 6 hours at 100° C. A 60% yield of purified 2-mercapto-thiazoline was obtained.

Example 12

Into a flask equipped with a good reflux condenser were placed 1 mole of ethanol amine, 2.8 moles of carbon disulfide, 2 moles of sodium hydroxide, and 8 moles of water. The mixture was refluxed for 8 hours on a water bath, then cooled and the contents allowed to crystallize. The product was crystallized from water, after which it melted at 105°–106° C. The yield of 2-mercapto-thiazoline was 40% of theory.

Example 13

A mixture of 3 parts ethanol amine, 3 parts alcohol, 4 parts carbon disulfide, and 1 part potassium hydroxide was refluxed on a water bath for 8 hours. The alcohol was evaporated, and the residue was cooled. By rubbing with a glass rod, crystals were made to separate. These were recrystallized from water, after which they melted at 105–106° C. The yield of 2-mercapto-thiazoline was 12%.

In the above examples, Example 13 illustrates the method which has been proposed in the prior art and Example 12 illustrates a method proposed by Stevenson in his copending application hereinbefore referred to. A simple comparison of these Examples 12 and 13 with Examples 1 to 11 clearly shows the very great advantages of the process of our invention.

While the above examples illustrate our preferred embodiments, it will be readily apparent to those skilled in the art that many variations may be made therein, particularly in the solvents, the temperatures and the proportions employed, without departing from the spirit of our invention. Such examples are given solely for purposes of illustration and our invention is not to be limited thereto, but is to be limited solely by the appended claims.

We have found 2-mercapto-thiazoline to be an excellent accelerator for the vulcanization of rubber, giving high moduli, high tensiles and safety toward activation. Rubber stocks in which this accelerator has been employed possess excellent resistance to ageing. The 2-mercapto-thiazoline, as produced in accordance with our invention, is in the form of a white powder or crystalline material of high purity, which is easily ground and readily disperses in rubber. It is odorless and imparts no odor or discoloration to the vulcanized rubber.

We claim:

1. The process of preparing 2-mercapto-thiazoline which comprises reacting ethanol amine with at least 2 molecular proportions of carbon disulfide in a closed vessel under superatmospheric pressures at temperatures in excess of 75° C.

2. The process of preparing 2-mercapto-thiazoline which comprises reacting ethanol amine with from about 2 to about 3 molecular proportions of carbon disulfide in a closed vessel under superatmospheric pressures at temperatures of from about 90° C. to substantially 130° C.

3. The process of preparing 2-mercapto-thiazolines which comprises reacting ethanol amine with at least 2 molecular proportions of carbon disulfide in a closed vessel under superatmospheric pressures at reaction temperatures in excess of 75° C. in the absence of alkali.

4. The process recited in the claim 3 and in which water is employed as reaction medium.

5. The process recited in the claim 3 and in which alcohol is employed as reaction medium.

6. The process recited in the claim 3 and in which an organic solvent is employed as reaction medium.

7. The process of preparing 2-mercapto-thiazoline which comprises introducing into a reaction vessel only ethanol amine and carbon disulfide in the proportions of at least 2 molecular proportions of carbon disulfide to each molecular proportion of ethanol amine, closing the vessel, and heating the vessel and its contents to temperatures in excess of 75° C. under super-atmospheric pressures.

8. The process of preparing 2-mercapto-thiazoline which comprises introducing into a reaction vessel only ethanol amine and carbon disulfide in the proportions of from about 2 to about 3 molecular proportions of carbon disulfide to each molecular proportion of ethanol amine, closing the vessel, and heating the vessel and its contents to temperatures of from substantially 90° C. to substantially 130° C. under super-atmospheric pressures.

IRA WILLIAMS.
BERNARD M. STURGIS.
JOHN J. VERBANC.

CERTIFICATE OF CORRECTION.

Patent No. 2,364,399. December 5, 1944.

IRA WILLIAMS, ET AL.

It is hereby certified that error appears in the printed specification of the above numbered patent requiring correction as follows: Page 3, first column, line 37, claim 2, for "about 90° C." read --substantially 90° C.--; and that the said Letters Patent should be read with this correction therein that the same may conform to the record of the case in the Patent Office.

Signed and sealed this 27th day of March, A. D. 1945.

Leslie Frazer (Seal) Acting Commissioner of Patents.

11 clearly shows the very great advantages of the process of our invention.

While the above examples illustrate our preferred embodiments, it will be readily apparent to those skilled in the art that many variations may be made therein, particularly in the solvents, the temperatures and the proportions employed, without departing from the spirit of our invention. Such examples are given solely for purposes of illustration and our invention is not to be limited thereto, but is to be limited solely by the appended claims.

We have found 2-mercapto-thiazoline to be an excellent accelerator for the vulcanization of rubber, giving high moduli, high tensiles and safety toward activation. Rubber stocks in which this accelerator has been employed possess excellent resistance to ageing. The 2-mercapto-thiazoline, as produced in accordance with our invention, is in the form of a white powder or crystalline material of high purity, which is easily ground and readily disperses in rubber. It is odorless and imparts no odor or discoloration to the vulcanized rubber.

We claim:

1. The process of preparing 2-mercapto-thiazoline which comprises reacting ethanol amine with at least 2 molecular proportions of carbon disulfide in a closed vessel under superatmospheric pressures at temperatures in excess of 75° C.

2. The process of preparing 2-mercapto-thiazoline which comprises reacting ethanol amine with from about 2 to about 3 molecular proportions of carbon disulfide in a closed vessel under superatmospheric pressures at temperatures of from about 90° C. to substantially 130° C.

3. The process of preparing 2-mercapto-thiazolines which comprises reacting ethanol amine with at least 2 molecular proportions of carbon disulfide in a closed vessel under superatmospheric pressures at reaction temperatures in excess of 75° C. in the absence of alkali.

4. The process recited in the claim 3 and in which water is employed as reaction medium.

5. The process recited in the claim 3 and in which alcohol is employed as reaction medium.

6. The process recited in the claim 3 and in which an organic solvent is employed as reaction medium.

7. The process of preparing 2-mercapto-thiazoline which comprises introducing into a reaction vessel only ethanol amine and carbon disulfide in the proportions of at least 2 molecular proportions of carbon disulfide to each molecular proportion of ethanol amine, closing the vessel, and heating the vessel and its contents to temperatures in excess of 75° C. under super-atmospheric pressures.

8. The process of preparing 2-mercapto-thiazoline which comprises introducing into a reaction vessel only ethanol amine and carbon disulfide in the proportions of from about 2 to about 3 molecular proportions of carbon disulfide to each molecular proportion of ethanol amine, closing the vessel, and heating the vessel and its contents to temperatures of from substantially 90° C. to substantially 130° C. under super-atmospheric pressures.

IRA WILLIAMS.
BERNARD M. STURGIS.
JOHN J. VERBANC.

---

CERTIFICATE OF CORRECTION.

Patent No. 2,364,399.            December 5, 1944.

IRA WILLIAMS, ET AL.

It is hereby certified that error appears in the printed specification of the above numbered patent requiring correction as follows: Page 3, first column, line 37, claim 2, for "about 90° C." read --substantially 90° C.--; and that the said Letters Patent should be read with this correction therein that the same may conform to the record of the case in the Patent Office.

Signed and sealed this 27th day of March, A. D. 1945.

Leslie Frazer (Seal)                   Acting Commissioner of Patents.